United States Patent [19]

McArthur

[11] Patent Number: 5,555,025
[45] Date of Patent: Sep. 10, 1996

[54] APPARATUS AND METHOD FOR PERFORMING ASYNCHRONOUS MULTI-STANDARD VBI DATA EXTRACTION

[75] Inventor: Kelly M. McArthur, Portland, Oreg.

[73] Assignee: Intel Corporation, Santa Clara, Calif.

[21] Appl. No.: 484,919

[22] Filed: Jun. 7, 1995

[51] Int. Cl.$^6$ .................................................. H04N 7/087
[52] U.S. Cl. ........................................ 348/478; 348/468
[58] Field of Search .................................. 348/478, 468, 348/192, 547; H04N 7/087

[56] References Cited

U.S. PATENT DOCUMENTS 5,463,423  10/1945  Tults ......................................... 348/478

*Primary Examiner*—Victor R. Kostak
*Attorney, Agent, or Firm*—Blakely, Sokoloff, Taylor & Zafman

[57] ABSTRACT

An asynchronous circuit for decoding Vertical Blanking Interval (VBI) television data having any one of a plurality of VBI formats comprises an input circuit, a register, a programmable clock generator, and a controller. The input circuit receives an analog television signal including VBI data and converts the television signal into standard digital form. The register receives and stores the VBI data in the digitized signal. The programmable clock generator receives a program signal from the controller and generates a clock which has a frequency that is an integer multiple of the data frequency, as determined by the program signal. The clock is asynchronous with the VBI data. The controller receives the digitized television signal, the clock, and a format signal from a host computer system indicating which VBI format is to be decoded. The controller provides the program signal based on the format signal and provides a sample signal at the data frequency in response to the clock signal and the VBI data, causing the register to load VBI data at approximately the midpoint in time of each bit of VBI data.

27 Claims, 5 Drawing Sheets

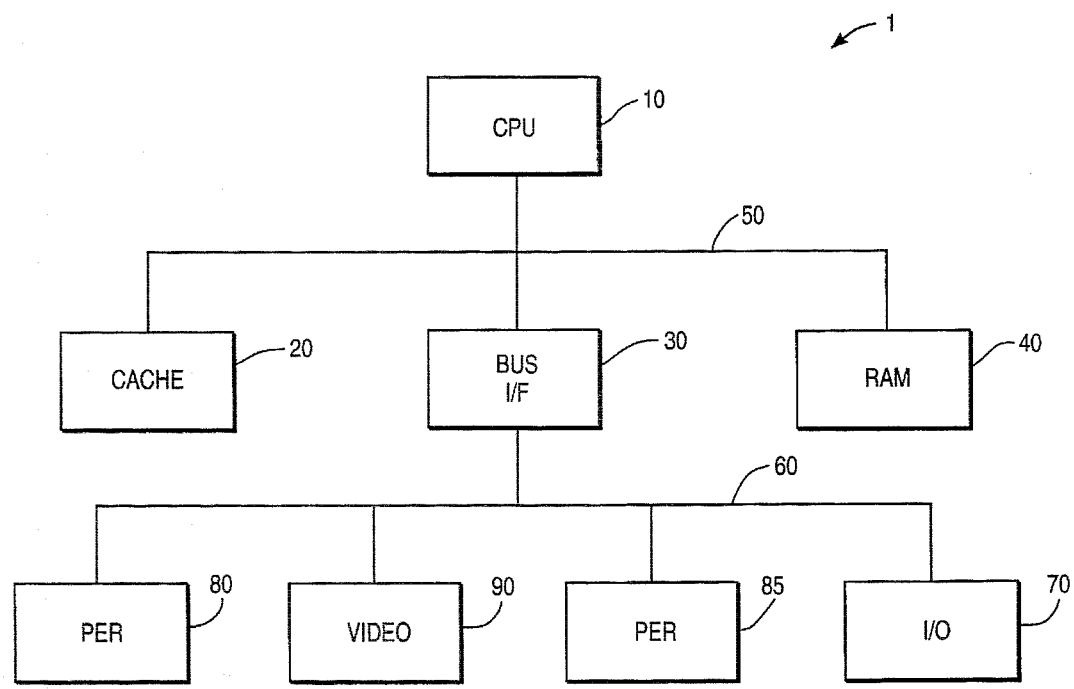
FIG_1
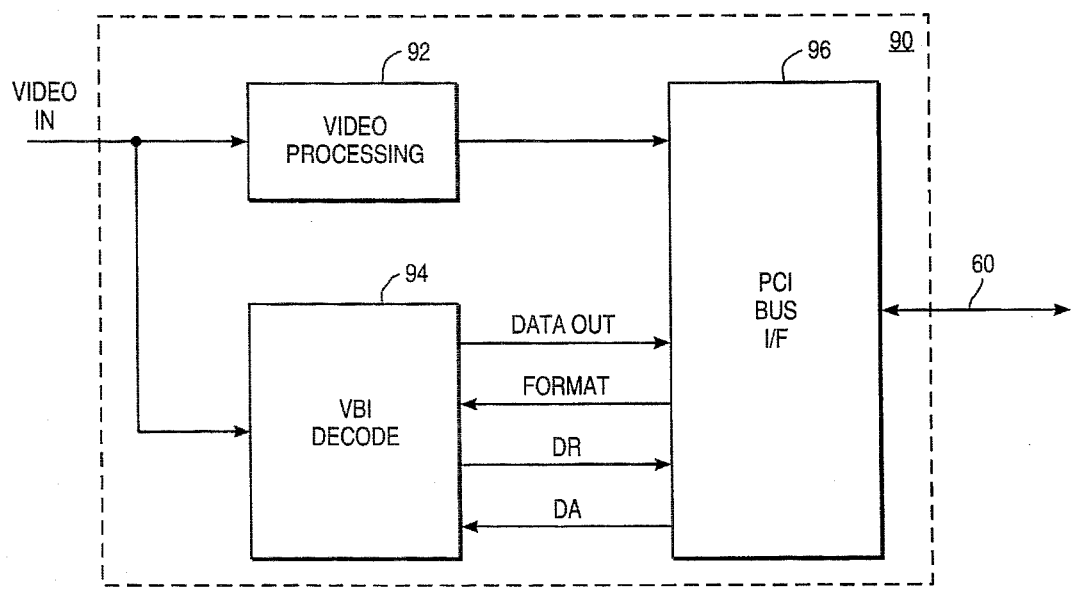
FIG_2

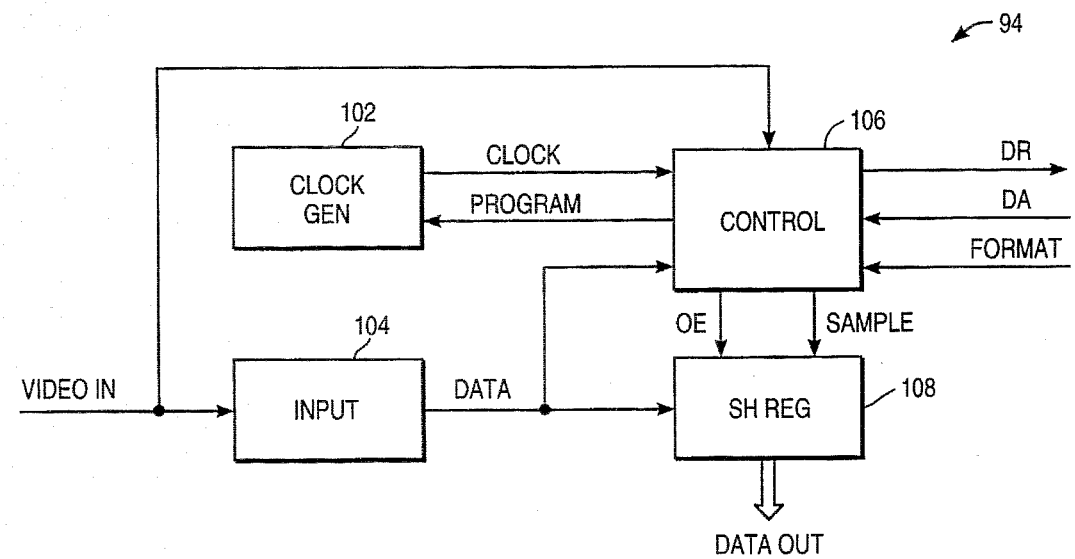
FIG_3A
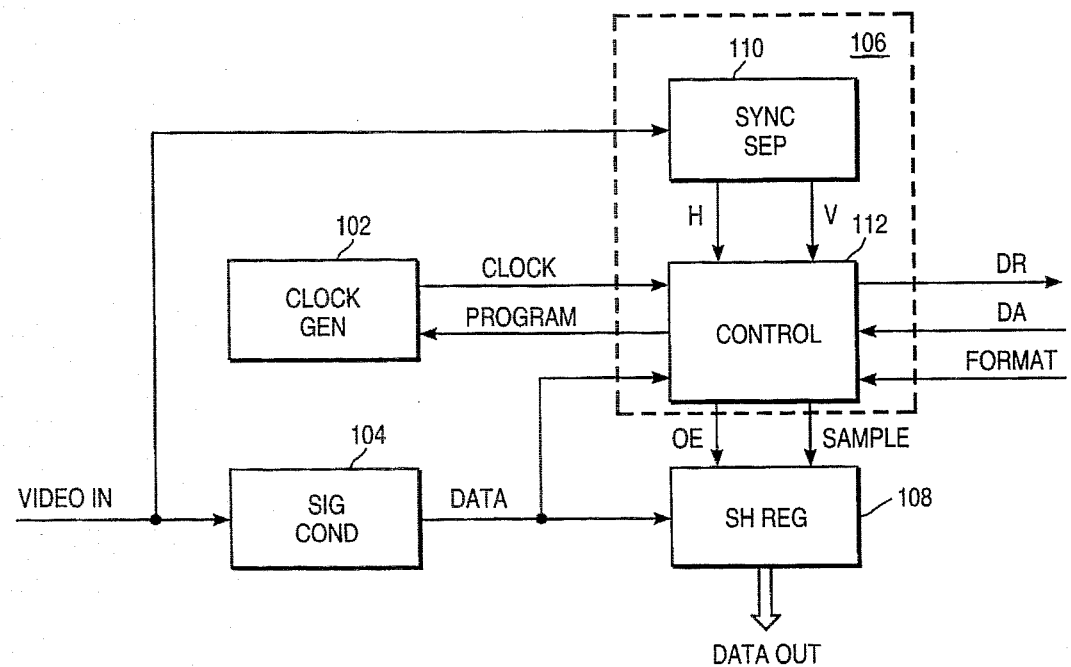
FIG_3B
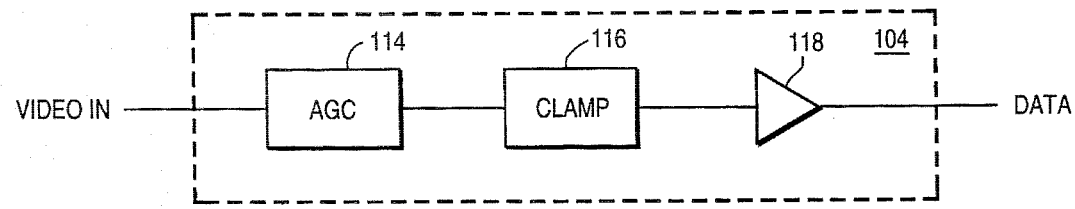
FIG_4

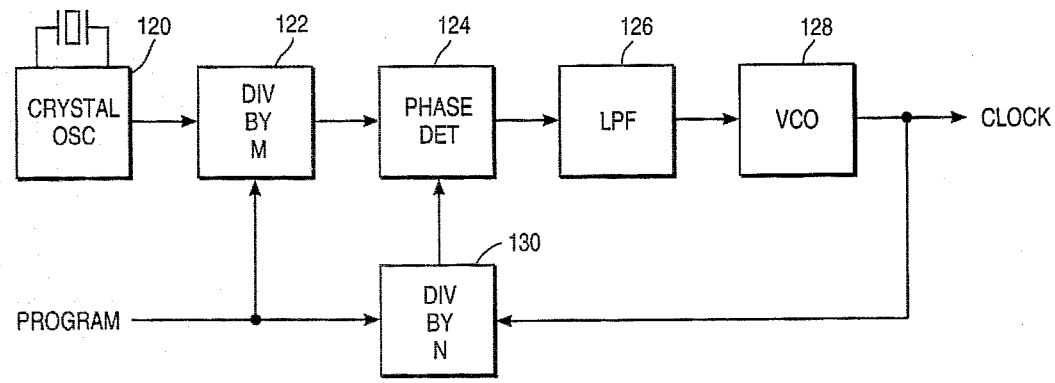
FIG_5
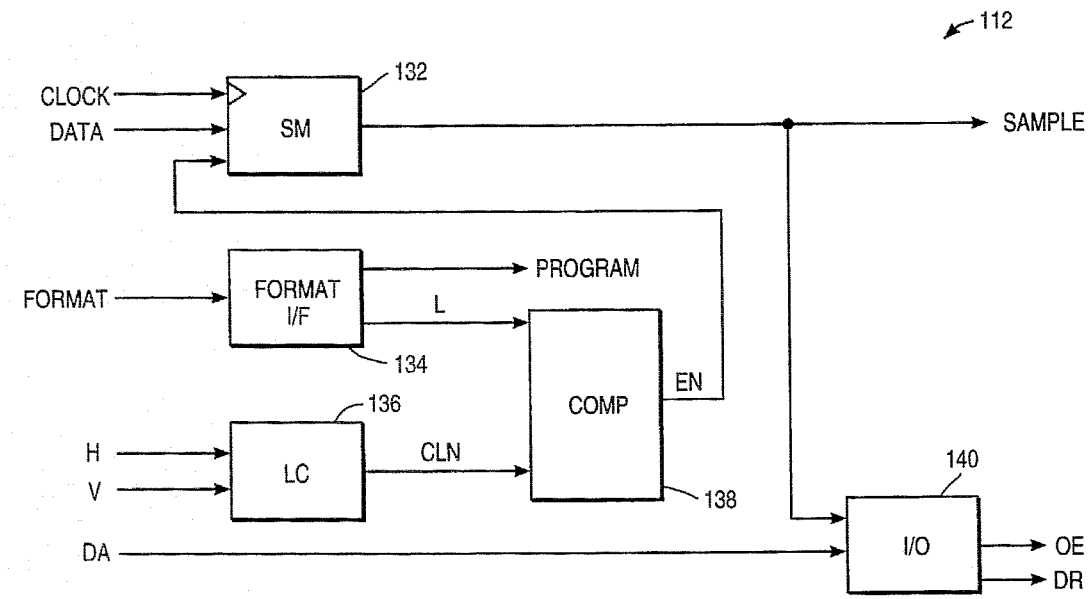
FIG_6

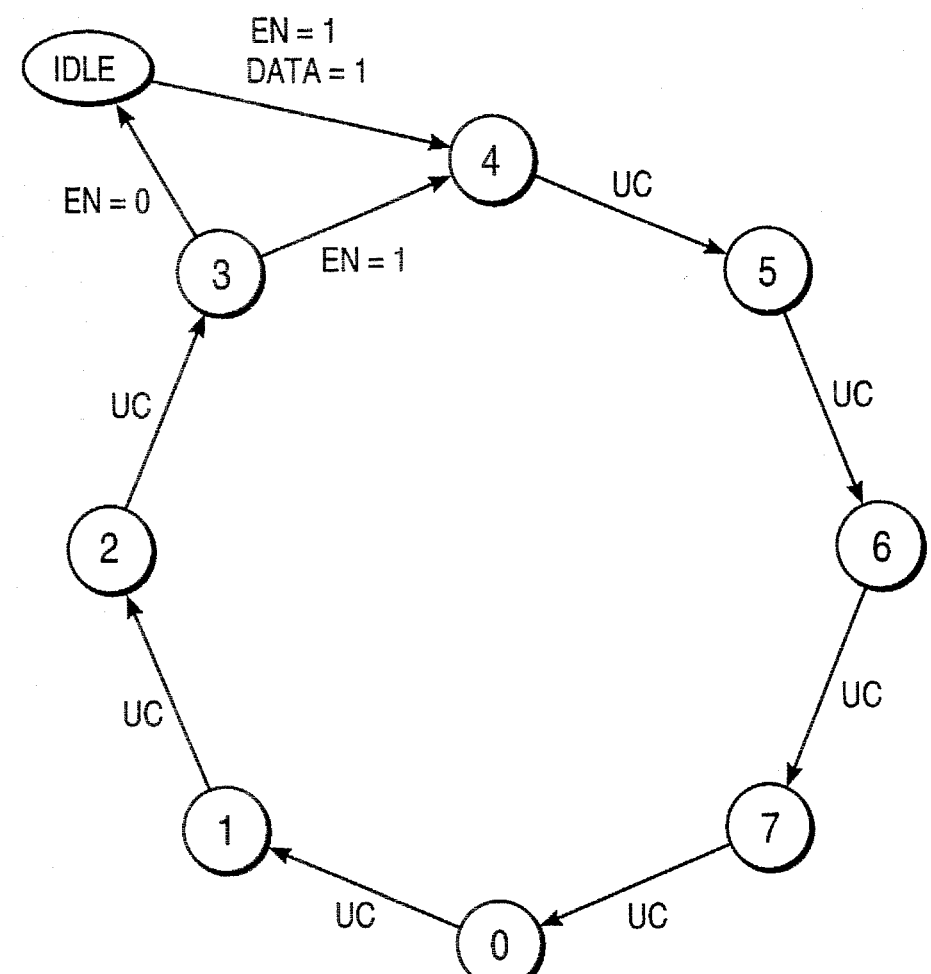
FIG_7

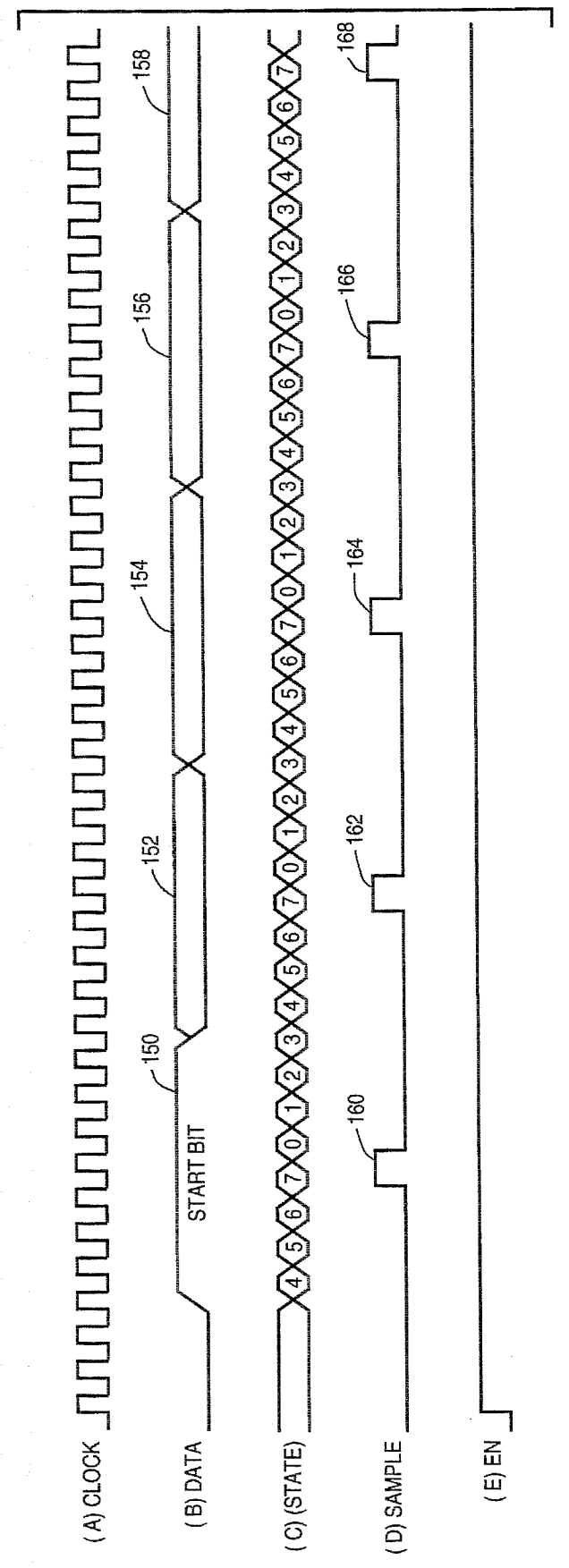

5,555,025

APPARATUS AND METHOD FOR PERFORMING ASYNCHRONOUS MULTI-STANDARD VBI DATA EXTRACTION

FIELD OF THE INVENTION

The present invention pertains to the field of television signal decoding. More particularly, the present invention relates to extraction of Vertical Blanking Interval (VBI) data from a television signal.

BACKGROUND OF THE INVENTION

In television broadcast systems, a television picture is referred to as a "raster". A raster consists of 525 horizontal lines of video data sent over the course of two successive fields. These lines are transmitted and then displayed in a receiving television set sequentially; however, they are displayed with such speed that a viewer sees only the complete picture, not individual lines. The first several lines of video data are not intended for display. These lines are said to be "blanked", and the time interval associated with these lines is referred to as the vertical blanking interval (VBI). VBI lines are often used to transmit a variety of test and control signals as well as certain types of data.

Various services make use of the VBI to transmit data, including Closed Caption for the hearing-impaired, A. C. Nielson program identification, and teletext news services. A variety of different data formats are used to support these various services. Although the television broadcast systems which are generally in use today transmit an analog signal, VBI data is essentially transmitted in a serial bitstream format. This is accomplished by switching the analog television signal between its highest and lowest amplitude levels. The VBI data is provided at a frequency which is an integer multiple of the horizontal line rate; the particular multiple used depends upon the VBI format being used (e.g., Closed Caption, Nielson, etc.).

Various different solutions exist for extracting the VBI data from a television signal. However, these solutions generally support only one VBI data format. Rapidly changing business and market conditions suggest that different VBI data formats may appear on different lines of video in different geographic regions. Further, VBI data formats may vary depending upon the cable television service provider. Therefore, maximum flexibility to decode multiple formats is desirable. However, separate hardware solutions supporting multiple formats would be cumbersome and expensive and would not be conducive to implementation in a board-level product. Software solutions, on the other hand, often have other disadvantages, such as being computationally intensive, requiring higher volumes of data transfer over the host interface, and incompatibility with the use of most video scalers. In addition, some VBI data formats, but not all, provide a "run-in" clock within the data stream to assist decoding circuitry in synchronizing to the data stream; such formats are referred to as "synchronous". Yet synchronous VBI data extraction solutions tend to be susceptible to phase error and instability. Consequently, an asynchronous VBI data extraction solution that is capable of decoding any VBI data format is desirable.

SUMMARY OF THE INVENTION

A circuit for decoding Vertical Blanking Interval (VBI) television data having any one of a plurality of VBI formats comprises an input circuit, a register, a programmable clock generator, and a controller. The input circuit is coupled to receive a television signal and to output digital VBI data at a data frequency in response to the television signal. The register is coupled to receive and store the VBI data. The programmable clock generator receives a program signal from the controller and generates a clock which has a frequency determined by the program signal. The clock is asynchronous with the VBI data. The controller is coupled to receive the VBI data, the clock, and a format signal indicating which VBI format is to be decoded. The controller provides the program signal based on the format signal and provides a sample signal at the data frequency in response to the clock signal and the VBI data, causing the register to load VBI data at approximately the midpoint in time of each bit of VBI data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 1 illustrates a computer system in which the present invention is implemented.

FIG. 2 illustrates a video capture add-in card.

FIG. 3A illustrates a VBI decoder according to one embodiment.

FIG. 3B illustrates a VBI decoder according to one embodiment extracting horizontal and vertical synchronization information from an input television signal.

FIG. 4 illustrates a video input circuit of a VBI decoder.

FIG. 5 illustrates a programmable clock generator of a VBI decoder.

FIG. 6 illustrates a control circuit of a VBI decoder.

FIG. 7 illustrates a state diagram describing the operation of a state machine in a VBI decoder.

FIG. 8 illustrates a timing diagram describing the operation of a VBI decoder.

DETAILED DESCRIPTION

An apparatus and method for performing asynchronous muli-standard vertical blanking interval (VBI) data extraction are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

FIG. 1 shows a computer system 1 in which the present invention is implemented. The computer system consists of a central processing unit (CPU) 10, a cache memory 20, a random access memory (RAM) 40, an input/output (I/O) device 70, peripheral devices 80 and 85, and a video capture card 90. The cache 20 and the RAM 40 are coupled to the CPU 10 by a system bus 50. I/O devices 70 and 75, peripherals 80 and 85, and video capture card 90 are coupled together on a peripheral component interconnect (PCI) bus 60. The PCI bus 60 is coupled to the system bus 50 through a bus interface 30. The present invention is implemented on the video capture card 90 which is shown in greater detail in FIG. 2.

Referring now to FIG. 2, the video capture card 90 includes video processing circuitry 92, a PCI bus interface 96, and VBI decoding circuitry 94. The video processing circuitry 92 and the VBI decoding circuitry 94 each receive a standard 1.5 V peak-to-peak television signal VIDEO IN having a horizontal line frequency of 15.734 KHz. The television signal VIDEO IN includes VBI data at a data frequency which is an integer multiple of the horizontal line frequency. Table 1 shows the relationship of the data frequencies of several common VBI data formats to the horizontal line frequency.

TABLE 1

| Data Frequency | Multiple of Horizontal Line Frequency | Format |
| --- | --- | --- |
| 503.5 KHz | 32 | Closed Caption |
| 1.007 MHz | 64 | A. C. Nielson, GENSTAR |
| 5.7272 MHz | 364 | WST, NABTS |

The video processing circuitry 92 provides standard front-end video processing functions, such as analog-to-digital conversion, decoding, and scaling functions. The VBI decoding circuitry 94 provides circuitry for extracting the VBI data from the television signal VIDEO IN. Both the video processing circuitry 92 and the VBI decoding circuitry 94 are coupled to the PCI bus 60 through a PCI bus control interface 96. Extracted VBI data is provided to the host processor by the VBI decoding circuitry 94 in the signal DATA OUT via the PCI bus control interface 96. The VBI decoding circuitry 94 receives a format signal FORMAT from the host CPU 10 specifying which format of VBI data is to be decoded. The transfer of extracted VBI data to the host processor is coordinated by a two-wire "handshake" signal pair between the VBI decoding circuitry 94 and the PCI bus control interface 96 consisting of a data ready signal DR provided by the VBI decoding circuitry 94 and a data acknowledge signal DA provided by the VBI bus control interface 96. Two-wire handshake signal pairs of this type are well-known in the art of digital electronics.

FIG. 3A illustrates the VBI decoding circuitry 94 in detail. The VBI decoding circuitry 94 consists of a clock generator 102, an input circuit 104, a controller 106, and a shift register 108. The television signal VIDEO IN is supplied to the input circuit 104 and the controller 106. Generally, the VBI decoding circuitry 94 extracts VBI data from the television signal VIDEO IN by generating a clock signal CLOCK which is an integer multiple of the data frequency and using this clock signal to sample each bit of VBI data at the midpoint in time of each bit, as will be described in greater detail below. The signal CLOCK is provided asynchronously with respect to the data in the television signal VIDEO IN. As will be apparent from the description below, the circuitry included in the VBI decoder 94 can be implemented by using an application-specific integrated circuit (ASIC) or by using discrete components and field programmable gate arrays (FPGA's).

As shown in FIG. 4, the input circuit 104 provides an automatic gain control (AGC) function 114, a clamping function 116, and a fast comparator 118 to convert the signal VIDEO IN into the signal DATA, which is a standard 0 to 5 V digital signal. The AGC and clamping functions can be provided by a common linear part, such as the National Semiconductor LM1201. The fast comparator can be provided by a standard part such as the LM311. The fast comparator provides a digital signal by comparing its input to a fixed voltage reference to establish a slice level. A 74HCT595 may be used as the shift register 108. The signal DATA is provided to the shift register 108 and to the controller 106. The shift register 108 provides a parallel data output DATA OUT to the PCI bus interface 96.

The controller 106 receives the format signal FORMAT indicating which VBI format is to be decoded from the host CPU 10 through the PCI bus interface 96. In response to the format signal FORMAT, the controller 106 provides a programming signal PROGRAM to the clock generator 102. The programming signal PROGRAM programs the frequency of the signal CLOCK provided by the clock generator 102 to the controller 106. The frequency of the signal CLOCK is an integer multiple of the data frequency of the signal VIDEO IN. The controller 106 responds to the signal VIDEO IN and to the clock signal by providing a signal SAMPLE to the shift register 108 to cause the shift register 108 to be loaded with VBI data in the signal DATA.

The shift register 108 is capable of storing 8 bits (1 byte) of VBI data. When the shift register 108 is fully loaded with 1 byte of VBI data the controller 106 provides an output enable signal OE to the shift register to cause the VBI data to be output from the shift register 108 to the PCI bus control interface 96 as signal DATA OUT. When the shift register 108 is fully loaded with VBI data, the controller 106 signals this condition to the host CPU 10 via the two-wire hand shake by asserting the data ready signal DR. When the host CPU 10 notifies the controller 106 in response to the data ready signal DR that it is ready to accept the VBI data, the host CPU 10 asserts the data acknowledge signal DA. In response to receiving the data acknowledge signal DA, the controller 106 then provides and output enable signal OE to the shift register 108 to cause the shift register 108 to output the VBI data as the signal DATA OUT.

Referring now to FIG. 3B, the controller 106 is shown in detail. The controller 106 includes a control circuit 112 and a sync separator 110. The sync separator 110 extracts horizontal and vertical synchronization data from the signal VIDEO IN and provides a horizontal sync signal H and a vertical sync signal V to the control circuit 112. The functions performed by the sync separator are well-known in the art and can be provided by using a device such as the National Semiconductor LM1881. Alternatively, certain commonly used video front-end chip sets, such as those manufactured by Phillips, also perform these functions; accordingly the sync separator 110 functions may be included in the video processing circuit 92 rather than in the controller 106 if such a front-end chip set is used.

FIG. 5 illustrates the clock generator 102 in detail. The clock generator 102 is a phase-locked loop (PLL) driven by a crystal oscillator 120. A crystal oscillator is used in order to provide a very stable clock signal. The clock generator 102 also includes a divide-by-M circuit 122, a phase detector 124, a low-pass filter 126, a voltage controller oscillator (VCO) 128 and a divide-by-N circuit 130. The divide-by-M circuit 122 receives input from the crystal oscillator 120 and provides output to the phase detector 124. The phase detector 124 provides input to the low-pass filter 126. The low-pass filter 126 provides input to the VCO 128. The output of the VCO 128 is the signal CLOCK. The signal CLOCK is fed back as input to the divide-by-N circuit 130. The divide-by-N circuit 130 then provides a second input to the phase detector 124. The divide-by-M circuit 122 and the divide-by-N circuit 130 each generate an output having a frequency that is the frequency of its input divided by M or N, respectively. The divide-by-M circuit 122 and the divide-by-N circuit 130 each receive as input the program signal PROGRAM, which programs the values of M and N. In the preferred embodiment, M and N are chosen such that the signal CLOCK has a frequency of eight (8) times the data frequency of the VBI data contained in the signal VIDEO IN.

As stated above, the signal VIDEO IN has a horizontal line frequency of 15.734 KHz, and existing VBI formats generally use a data frequency that is an integer multiple of the horizontal line rate. Consequently, the crystal oscillator 120 is chosen such that it generates a frequency of 1.432 MHz, which is 91×15.734 KHz. This frequency is chosen to allow for convenient generation of the required frequencies while maintaining a relatively low reference frequency in order to provide flexibility in selecting PLL hardware. Note that small outline packages are available that incorporate the crystal oscillator 120, the divide-by-M circuit 122, the divide-by-N circuit 130, and a serial programming interface. In this embodiment, the phase detector 124 must operate at a maximum frequency of only 1.432 MHz and the VCO must operate only over approximately a single decade from approximately 4 MHz to 50 MHz. Table 2 shows the required values of N and M to obtain a clock having a frequency of eight (8) times the VBI data frequency using a 1.432 MHz crystal oscillator.

TABLE 2

| Format | Data Frequency (MHz) | Multiple of Horizontal Line Frequency | CLOCK frequency (MHz) | N | M |
|---|---|---|---|---|---|
| Closed Caption | 0.5035 | 32 | 4.028 | 256 | 91 |
| A. C. Nielson, GENSTAR | 1.007 | 64 | 8.056 | 512 | 91 |
| WST, NABTS | 5.7272 | 364 | 45.8181 | 32 | 1 |

FIG. 6 illustrates the control circuit 112 in detail. The control circuit 112 includes a state machine 132, a format interface 134, a comparator 138, a line counter 136, and an I/O circuit 140. The control circuit 112 provides the following three functions: 1) programming the line counter 136 to allow selection of particular lines of even or odd fields of VBI data to extract; 2) programming the clock generator 102 for the selected data rate; and, 3) controlling the data interface with the host processor 10 via the PCI bus 60. The format interface 134 provides the programming interface with the host. In particular, the format interface 134 receives the signal FORMAT specifying which VBI format is to be decoded. In response to the signal FORMAT, the format interface 134 provides the signal PROGRAM to the clock generator 102 to program the values of M and N. In addition, the format interface 134 provides a line enable signal L to the comparator specifying which lines of the VBI contain valid VBI data based on the specified format. The line counter 136 counts horizontal lines of the signal VIDEO IN. Each time a horizontal sync pulse H is received, the line count is increased by 1. The line count is reset to 0 by the vertical sync pulse V. The line counter 136 outputs a current line number CLN to the comparator 138. When the current line number CLN and the line enable signal L are in agreement, the comparator issues and enable signal EN to the state machine 132. When a VBI line which does not contain valid data for the selected format is being transmitted, the enable signal EN is deasserted.

The state machine 132 provides logic that causes the VBI data to be sampled at the center of each VBI data bit. FIG. 7 provides a state diagram describing the function of the state machine 132. Referring now to both FIGS. 6 and 7, the state machine 132 is initially in an idle state. When a video line which contains valid VBI data is being received (as determined by the selected format), then the enable signal EN will be asserted. Once the enable signal EN is asserted, the state machine 132 will wait until the rising edge of a start bit in the signal DATA. When the rising edge of the start bit is detected, the state machine 132 will begin counting from a count of four (4) to a count of seven (7) at a rate of eight (8) times the data frequency. Upon reaching a count of seven (7), the state machine 132 will assert the sample signal SAMPLE. The sample signal SAMPLE causes the shift register 108 to shift in one bit of VBI data, which is provided by the signal DATA. Thereafter, the state machine will continue counting from zero (0) to seven (7), asserting the sample signal SAMPLE to load the shift register 108 at the count of seven (7) each time, until the enable signal EN is deasserted. If the enable signal EN is deasserted while the state machine is counting, then the state machine 132 will continue to count until it reaches a count of three (3), at which time the state machine 132 will re-enter the idle state. As a result, for each bit of VBI data, the sample signal SAMPLE is asserted in the middle of the time interval for that bit, as shown in FIG. 8.

The I/O circuit 140 receives the sample signal SAMPLE and determines when a valid byte of data is loaded in the shift register 108. When a valid byte is ready, the I/O circuit 140 asserts the data ready signal DR. The I/O circuit 140 also receives the data acknowledge signal DA and, in response, provides the output enable signal OE to the shift register 108 to cause the shift register 108 to output data as signal DATA OUT to the PCI bus control interface 96.

FIG. 8 provides a timing diagram which illustrates the operation of the present invention. The rising edge of a start bit 150 initiates the extraction of VBI data when the enable signal EN is asserted. Accordingly, pulses 162, 164, 166 and 168 of the sample signal SAMPLE are asserted at the midpoints in time of bits 152, 154, 156 and 158 of the signal DATA to load VBI data into the shift register 108.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A circuit for decoding Vertical Blanking Interval (VBI) television data having any one of a plurality of VBI formats, comprising:

an input circuit coupled to receive a television signal and to output in response thereto digital VBI data at a data frequency;

a register coupled to receive and store the VBI data;

a programmable clock generator receiving a program signal and generating a clock signal having a frequency determined by the program signal, wherein the clock signal is asynchronous with the VBI data; and a control circuit coupled to receive the VBI data, the clock signal, and a format signal indicating which VBI format is to be decoded, wherein the control circuit provides the program signal based on the format signal, and wherein the control circuit provides a sample signal at the data frequency in response to the clock signal and the VBI data to cause the register to load VBI data at approximately the midpoint in time of each bit of VBI data.

2. The circuit of claim 1, wherein the frequency of the clock is an integer multiple of the data frequency.

3. The circuit of claim 1, wherein the control circuit comprises a state machine coupled to receive the clock and the VBI data and generating in response thereto the sample signal.

4. The circuit of claim 3, wherein the control circuit further comprises:

a line counter coupled to receive line synchronization data from the television signal, wherein the line counter outputs a current line number based on the synchronization data;

a register interface to receive and store format data from the format signal; and a comparator coupled to receive an output of the register interface and the current line number, the comparator generating an enable signal when the current line number corresponds to the format data;

wherein the state machine is further coupled to receive the enable signal, such that the sample signal is generated in response to the clock while the enable signal is asserted.

5. The circuit of claim 3, wherein the control circuit further comprises an input/output circuit coupled to the state machine and the register to signal a host processor and enable the register to output when the register is fully loaded.

6. The circuit of claim 1, wherein the input circuit comprises a fast comparator for converting the television signal to digital VBI data.

7. The circuit of claim 1, wherein the clock generator comprises a crystal oscillator.

8. The circuit of claim 7, wherein the clock generator is a phase-locked loop.

9. A circuit for decoding Vertical Blanking Interval (VBI) television data having any one of a plurality of VBI formats, comprising:

an input circuit coupled to receive a television signal and to output in response thereto digital VBI data at a data frequency, the VBI data including a plurality of bits, each having a data interval;

a shift register coupled to receive and store the VBI data;

a programmable clock generator receiving a program signal and generating a clock signal having a clock frequency which is an integer multiple of the data frequency, wherein the clock signal is asynchronous relative to the television signal and wherein the clock frequency is determined by the program signal; and a control circuit coupled to receive a format signal indicating which VBI format is to be decoded, the clock signal, the digital VBI data, a horizontal sync signal, and a vertical sync signal, wherein the control circuit provides:

the program signal to the clock generator based on the format signal; and a sample signal to the shift register at the data frequency in response to the clock signal and based on the format signal and the horizontal and vertical sync signals, to load the VBI data into the shift register at approximately the middle of the data interval of each bit of VBI data by counting cycles of the clock signal, such that valid VBI data is extracted from the television signal.

10. A circuit for decoding Vertical Blanking Interval (VBI) television data having any one of a plurality of VBI formats, comprising:

input means coupled to receive a television signal for outputting digital VBI data at a data frequency in response to the television signal;

storage means for receiving and storing the VBI data;

clock generator means for generating a clock signal in response to a program signal, the clock signal having a frequency determined by the program signal, wherein the clock signal is asynchronous with the VBI data; and control means coupled to receive the VBI data, the clock signal, and a format signal indicating which VBI format is to be decoded, for providing the program signal based on the format signal and for providing a sample signal at the data frequency in response to the clock signal and the VBI data to cause the VBI data to be loaded into the storage means at approximately the midpoint in time of each bit of VBI data.

11. The circuit of claim 10, wherein the frequency of the clock is an integer multiple of the data frequency.

12. The circuit of claim 10, wherein the control means comprises state machine means coupled to receive the clock and the VBI data and generating in response thereto the sample signal.

13. The circuit of claim 12, wherein the control means further comprises:

line counter means coupled to receive line synchronization data from the television signal for outputting a current line indication based on the synchronization data;

interface means for receiving and storing format data from the format signal; and comparator means coupled to receive an output of the interface means and the current line indication for generating an enable signal when the current line indication corresponds to the format data; and state machine means coupled to receive the enable signal, for generating the sample signal in response to the clock signal while the enable signal is asserted.

14. The circuit of claim 10, wherein the input means comprises comparator means for converting the television signal to digital VBI data.

15. The circuit of claim 10, wherein the clock generator means comprises a crystal oscillator.

16. A circuit for extracting Vertical Blanking Interval (VBI) data having any one of a plurality of VBI formats from a television signal, comprising:

means for selecting one of the VBI formats to be decoded;

means for converting the television signal into digital form, wherein the television signal includes VBI data including a plurality of bits at a data frequency that corresponds to the selected format;

means for providing a clock that is asynchronous with the television signal at a clock frequency that is an integer multiple of the data frequency; and means for sampling the VBI data in response to the clock at the data frequency at approximately the midpoint in time of each bit of VBI data.

17. The circuit of claim 16, wherein the means for providing a clock comprises means for establishing the clock frequency based on the selected format.

18. The circuit of claim 16, wherein the means for sampling comprises:

means for waiting for an occurrence of a start bit in the VBI data;

means for counting, upon the occurrence of the start bit, N cycles of the clock, where N is an integer substantially equal to one-half the integer multiple; and means for repeatedly sampling, beginning at the end of the Nth cycle of the clock following the occurrence of the start bit, the VBI data at the data frequency.

19. The circuit of claim 16, further comprising means for storing the sampled VBI data in a storage device.

20. A method of extracting Vertical Blanking Interval (VBI) data having any one of a plurality of VBI formats from a television signal, the method comprising the steps of:

selecting one of the VBI formats to be decoded;

converting the television signal into digital form, wherein the television signal includes VBI data including a plurality of bits at a data frequency that corresponds to the selected format;

providing a clock that is asynchronous with the television signal at a clock frequency that is an integer multiple of the data frequency; and sampling the VBI data in response to the clock at the data frequency at approximately the midpoint in time of each bit of VBI data.

21. The method of claim 20, wherein the step of providing a clock comprises the step of establishing the clock frequency based on the selected format.

22. The method of claim 20, wherein the step of sampling comprises the steps of:

waiting for an occurrence of a start bit in the VBI data;

upon the occurrence of the start bit, counting N cycles of the clock, where N is an integer substantially equal to one-half the integer multiple; and beginning at the end of the Nth cycle of the clock following the occurrence of the start bit, repeatedly sampling the VBI data at the data frequency.

23. The method of claim 20, further comprising the step of storing the sampled VBI data in a storage device.

24. A computer system having a processor, a memory, at least one input/output device, and video capture circuitry for receiving and decoding a television signal, the video capture circuitry including extraction circuitry for extracting VBI data in the television signal, the extraction circuitry comprising:

an input circuit coupled to receive the television signal and to output in response thereto digital VBI data at a data frequency;

a register coupled to receive and store the VBI data;

a programmable clock generator receiving a program signal and generating a clock signal having a frequency determined by the program signal, wherein the clock signal is asynchronous with the VBI data; and a control circuit coupled to receive the VBI data, the clock signal, and a format signal indicating which VBI format is to be decoded, wherein the control circuit provides the program signal based on the format signal, and wherein the control circuit provides a sample signal at the data frequency in response to the clock signal and the VBI data to cause the register to load VBI data at approximately the midpoint in time of each bit of VBI data.

25. The computer system of claim 24, wherein the control circuit comprises a state machine coupled to receive the clock and the VBI data and generating in response thereto the sample signal.

26. The computer system of claim 25, wherein the control circuit further comprises:

a line counter coupled to receive line synchronization data from the television signal, wherein the line counter outputs a current line number based on the synchronization data;

a register interface to receive and store format data from the format signal;

a comparator coupled to receive an output of the register interface and the current line number, the comparator generating an enable signal when the current line number corresponds to the format data; and wherein the state machine is further coupled to receive the enable signal, such that the sample signal is generated in response to the clock while the enable signal is asserted.

27. A computer system having a processor, a memory, at least one input/output device, and video capture circuitry for receiving and decoding a television signal, the video capture circuitry including extraction means for extracting VBI data in the television signal, the extraction means comprising:

input means coupled to receive the television signal for outputting in response thereto digital VBI data at a data frequency, the VBI data including a plurality of bits, each having a data interval;

register means coupled to the input means for storing the VBI data;

clock generator means for receiving a program signal and generating a clock signal having a clock frequency which is an integer multiple of the data frequency, wherein the clock signal is asynchronous relative to the television signal and wherein the clock frequency is determined by the program signal; and control means, coupled to receive a format signal indicating which VBI format is to be decoded, the clock signal, the VBI data, a horizontal sync signal, and a vertical sync signal, for providing:

the program signal to the clock generator means based on the format signal; and a sample signal to the register means at the data frequency in response to the clock signal and based on the format signal and the horizontal and vertical sync signals, to load the VBI data into the register means at approximately the middle of the data interval of each bit of VBI data by counting cycles of the clock signal, such that valid VBI data is extracted from the television signal.

* * * * *